United States Patent Office 3,317,721
Patented May 2, 1967

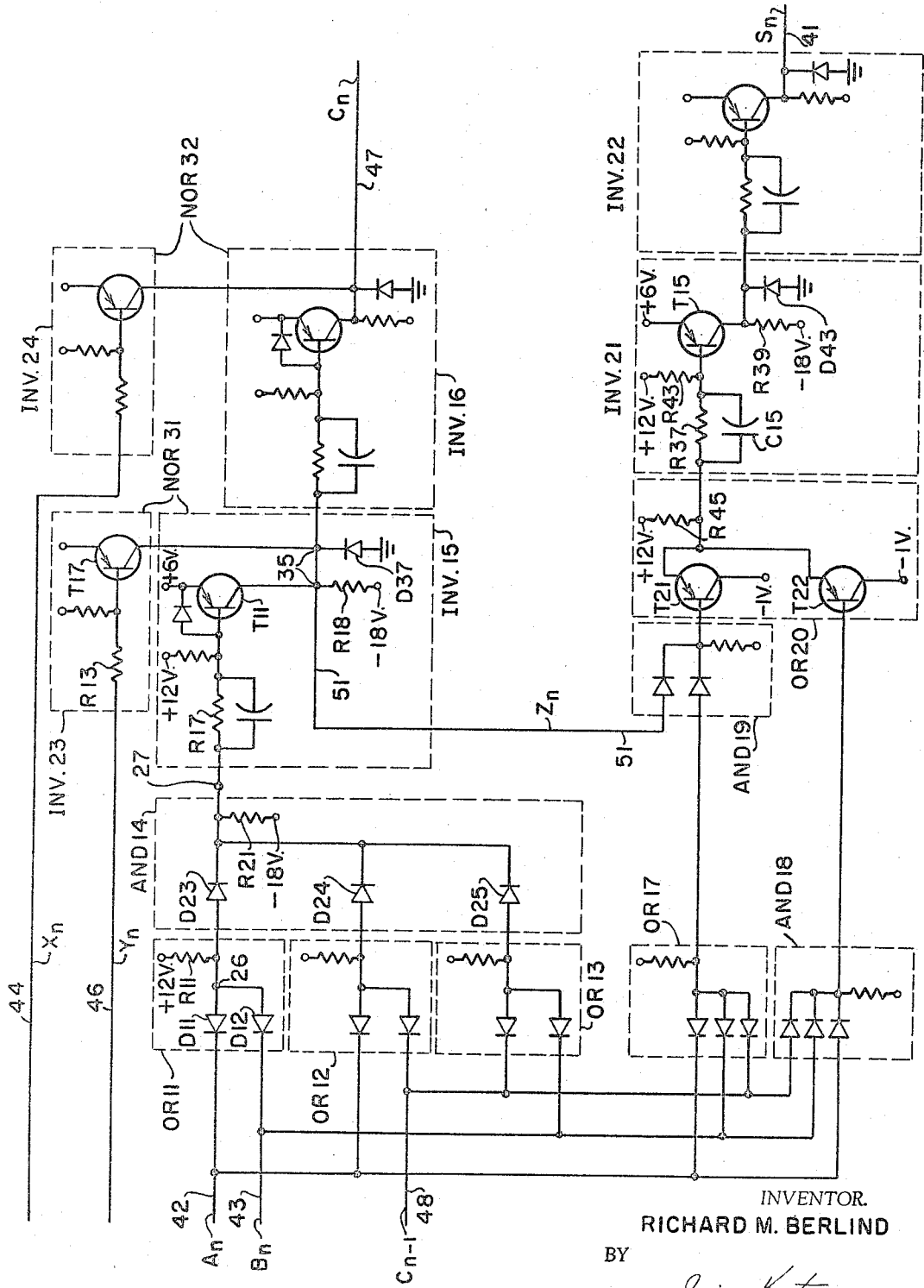

---

3,317,721
DIGITAL FULL ADDER WITH SPECIAL LOGIC FUNCTIONS
Richard M. Berlind, Phoenix, Ariz., assignor to General Electric Company, a corporation of New York
Filed June 27, 1963, Ser. No. 291,166
9 Claims. (Cl. 235—176)

This invention relates to a full adder for a digital computer, and more particularly to a full adder capable of performing special logic functions in addition to its typical computational function.

In certain digital computer applications, and especially in the use of digital computers operating in real time to control industrial processes, the capacity of digital circuits to perform logic, as well as computational functions, has assumed considerable importance. Examples of processes that may be automatically controlled by computer are a steam turbine electric generating and power distributing plant, a nuclear reactor, a chemical manufacturing plant involving a sequence of chemical processes, and steel processing mills.

The function of the digital computer in controlling such processes involves more than computation and numerical data processing; logic functions must also be performed at critical points in the process under control to the end that the proper course of action among possibly many alternatives may be taken when the requirements of the process itself dictate that corrective or alternative action is needed. Thus, in a process control computer, logic functions of the exclusive OR and logical AND types may be required. For example, it is sometimes the case that variable conditions in the process, such as temperature and pressure in a steam turbine, neutron flux density in a nuclear reactor, and time in any control application, must be sensed to the end that if any of these parameters reach a critical limit, appropriate action may be taken. In such situations a limit switch may be actuated when the sensed parameter reaches its limit. Sometimes the limit is one wherein an excessive magnitude actuates the limit switch while sometimes an inadequate magnitude in the parameter actuates the switch. It is often convenient to indicate an excessive magnitude by the closing of the switch and to indicate a limit characterized by insufficient magnitude by the opening of the switch. In any event, to properly monitor all of these parameters through the monitoring of the limit switches, it is important that a change in the state of the limit switch be detected, whatever the change may be. Consequently, the monitoring of these switches involves sensing the present states of the switches and comparing them with the prior states. If the comparison of states shows a difference, then some type of limit has been reached and corrective action should be taken. The comparison of the previous and present states of a binary device is readily accomplished by the application of these two states to an exclusive OR logic circuit which will provide an output only if one of the two states is different from that of the other.

The logical AND function is similarly important when, for example, a particular function should be performed or action taken by the computer at a specified point in time. Typically, when the precise point in time is reached, a time signal is generated and if the signal for a particular function or operation is also present and coincident with the time signal, then an output from an AND circuit (to which these two signals are applied) is generated and the function performed accordingly.

Since there are many parameters of significance in any process controlled by a computer, many such exclusive OR and logical AND operations may be required to be performed. One obvious approach to performing these logical operations is to provide an entire separate array of exclusive OR and logical AND circuits for this purpose. However, it has been discovered in accordance with the principles of the invention, that all of these exclusive OR and logical AND functions which are required in the operation of a process control computer can be provided largely with the circuitry already part of the computer. More specifically, full adder circuits which are an essential part of any digital computer may, with appropriate modification in accordance with the principles of the invention, be applied to provide these special logic functions. Moreover, since most digital computers presently being used, and probably all digital computers used for real time process control applications, have parallel type computational arrangements, the adder of the computer comprises as many full adders arranged in parallel as there are digits in the standard number or word handled by the computer. In the case of a parallel binary adder, there is a full adder for each bit, i.e., binary digit, in the number which the system handles, and the number or word length may well be twenty bits or more. Thus, such a computer will have twenty full adders or more in parallel array in its arithmetic unit.

It is accordingly an object of this invention to provide improved apparatus for performing computation and logic functions in a digital computer.

It is another object of this invention to provide improved apparatus for performing an exclusive OR function in addition to a computation function.

It is a further object of this invention to provide an improved circuit for performing arithmetic, logical AND and exclusive OR operations in a digital computer.

In accordance with the principles of the invention, it was recognized that at the time the logical AND and exclusive OR comparison functions are required, the circuitry of the full adder is not needed for its ordinary computational function. This means that there are as many full adders available for use in performing logical functions as there are full adders in the parallel adder. Thus, for example, in a computer having a twenty full adder array for its parallel adder, twenty exclusive OR or logical AND functions, or any combination thereof, may be performed simultaneously. It is one of the features of the invention, that the full adders themselves are used in their entirety with each one providing either the exclusive OR or logical AND function, as required. This is accomplished in accordance with the principles of the invention by incorporating simple circuitry in combination with each full adder which constrains the carry signal to that full adder to assume one logic state when the exclusive OR function is required of that full adder, while the carry signal thereto is constrained to assume the opposite binary state when the logical AND function is required of that full adder. The output from the adder for both logic operations is taken from the lead that ordinarily supports the sum signal during computation.

In one particular embodiment of the invention to be described, this operation is acomplished by incorporating two inverter circuits in the full adder in an ararngement determined by the principles of the invention. The full adder may then operate in its normal computational mode, its exclusive OR mode, or its logical AND mode, dependent upon the permutation of binary control signals applied to the input leads of the two inverters.

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawing.

The drawing is a schematic circuit representation of a full adder incorporating the logical AND and exclusive OR features in accordance with the principles of the invention. It is to be understood that this circuit represents merely one embodiment of the principles of the invention, and that these principles may properly be embodied in other forms of full adder circuits to provide the desired results.

Usually a multiplicity of full adder circuits is arranged in parallel array in a digital computer to comprise a parallel adder. Thus, to properly identify from whence signals originate and to where they go in the full adders, the following notation will be observed hereinafter. Any upper case letter identifies the signal, and its subscript identifies the full adder stage to which it is related. Thus $A_n$ or $B_n$ indicates that these signals are applied to the $n$th full adder stage (which is the stage shown in the drawing). A letter designation with a subscript such as $n-1$, for example, $C_{n-1}$, indicates that the signal, in this the carry signal, is derived from the full adder stage preceding the full adder of the drawing. The $n-1$ full adder is of lower significance by one binary digit. Similarly, $C_{n+1}$ indicates a carry signal which is generated in the full adder which represents one level of binary significance greater.

In the drawing the detailed schematic representation of the full adder with special logic functions, is arranged with schematic circuit components grouped together in broken-line blocks to highlight their logic functions. In particular, the logic functions incorporated in the drawing are the logical OR, AND, NOR, and inversion.

The full adder stage comprises two half adders. One of the half adders, comprising OR gates 11, 12, and 13, followed by AND gate 14 and thence by inverters 15 and 16, generates the carry signal, $C_n$, in the performance of the addition function. The other half adder, comprising OR gate 17 and AND gate 18 followed by the AND and OR gates 19 and 20, and thence by inverters 21 and 22, provides the sum output signal $S_n$ from this adder stage. The only logic components of the circuit thus far not mentioned, are the inverters 23 and 24 which are coupled to inverters 15 and 16, respectively, so that inverter 15 and 23 constitute a NOR gate 31, and inverters 16 and 24 constitute a NOR gate 32. The manner in which the exclusive OR and logical AND control signals $X_n$ and $Y_n$ are applied to NOR gates 31 and 32, respectively, for providing the control function will be discussed in greater detail below. However, it may be noted that the output from NOR gate 31 is also applied as an input $Z_n$ to AND gate 19 which plays a role in the provision of the logical AND control function as well hereinafter be seen.

Considering the circuit of the drawing in greater detail, input signals $A_n$ and $B_n$, along with the carry signal $C_{n-1}$ from the preceding and next less significant full adder stage, are aplied to the two-input OR gates 11, 12 and 13 in the three possible combinations of two. An OR gate as is well known in the art, provides the logical OR function which means that an output signal is generated from the OR circuit when there is an input signal at any one or more of the input terminals.

More specifically, OR gate 11 comprises diodes D11 and D12 in parallel with $A_n$ and $B_n$ inputs applied, respectively, to the cathodes of the diodes. The output from OR gate 11 is taken from the common diode connection point 26. The circuit is characterized by the "pull-up" resistor R11 which provides a positive control voltage (indicated to be +12 volts for this circuit) to the circuit. Although OR gate 11 is a two-input gate, an indefinite number of additional inputs may be obtained by connecting additional diodes in parallel with diodes D11 nad D12. Thus, for example, OR gate 17 is a three-input OR gate. The circuit operation of OR gate 11 follows the general rule that the voltage at the output of the gate, i.e., the common diode connection point 26, follows the lowest voltage input.

Everywhere in the drawing and throughout the discussion to follow, it is to be understood that a true logic signal, or binary one representation, is represented in the circuit by zero volts or ground, while a false logic signal or binary zero is represented by +6 volts.

Consider the circuit operation of OR gate 11, first when both the $A_n$ and $B_n$ inputs are in the binary one state. Diodes D11 and D12 are forward biased, with zero volts on the cathode and a path from the anodes to the +12 volt supply through resistor R11. Current flows from both the $A_n$ and $B_n$ input leads through double diodes D11 and D12 and resistor R11 to the +12 volt supply. The value of resistor R11 is very large compared with the forward resistance of D11 and D12; thus, most of the 12 volt potential between the gate input levels and the pull-up supply is dropped across resistor R11 and the output of OR gate 11 is at approximately zero volts representing the binary one state. When the input $B_n$ changes state to binary zero or +6 volts, diode D12 is immediately reverse-biased, since its anode is held at zero volts through D11. D11 continues to conduct, holding the output at the binary one state or zero volts. With $B_n$ in the binary zero state, should the input $A_n$ suddenly change state to binary zero and therefore rise in potential to +6 volts, there is a +6 voltage level at both inputs and diode D12 is again forward-biased and diode D11 continues to conduct. Now, however, the potential between the inputs and the pull-up supply is only 6 volts. With the diodes forward-biased, most of this potential is dropped across resistor R11 and the output of OR gate 11 is clamped at the input voltage to +6 volts. Accordingly, the output of OR gate 11 is in binary state zero in accordance with the previously mentioned logic operation of an OR gate. If under these conditions, $B_n$ changes state to binary one (zero volts), D12 becomes forward-biased by a total of 6 volts. Current through D12 increases greatly, increasing the voltage drop across resistor R11 and thereby lowering the potential at the anodes of both diodes. With input $A_n$ still at binary zero or +6 volts, D11 is reverse-biased as soon as its anode potential drops below +6 volts. The output of OR gate 11 is then clamped at zero volts through diode D11 and accordingly the output has appropriately changed state to binary one.

Precisely the same type of OR gates is represented by the OR gate packages 12, 13 and 17. As previously mentioned, OR gate 17 includes three inputs. Furthermore, the inputs to the OR gates are different as indicated. Thus, the inputs to OR gate 12 are $A_n$ and $C_{n-1}$; to OR gate 13 they are $B_n$ and $C_{n-1}$, while to OR gate 17, they are $A_n$, $B_n$ and $C_{n-1}$.

The outputs of OR gates 11, 12 and 13 are applied as inputs to AND gate 14. AND gate 14 comprises a plurality of diodes disposed in parallel, all of which are oppositely poled from the OR gates previously described. The circuit operation of an AND gate follows the general rule that the voltage at the output of the AND gate follows the highest input voltage. More specifically, in operation with all of the inputs in the binary one state (zero volts), the diodes D23, D24 and D25 are forward-biased and current flows from the three inputs through the diodes and through resistor R21 to the −18 volt supply. The output of AND gate 14 is clamped near zero volts by the low forward drop of the diodes. When any one of the three inputs changes state to binary zero (+6 volts), its associateed dioded receives an additional forward-bias of 6 volts. Current through that diode increases, increasing the voltage drop across resistor R21 and increasing the cathode potential of all the diodes. With the other two diodes still in a binary state one, or zero volts, the other two diodes are reverse-biased as soon as their cathode potential rises above zero volts. The other diode continues to conduct, clamping the output of the AND gate to its binary zero or +6 volts level. In similar fashion, the gate operates if the signal on either of the other two diode inputs changes state to binary zero, either alone or coincident with the other inputs. In this way, the output of the AND gate is in the binary one state or at zero volts only if all three inputs are at the binary one state. AND gate 18 and 19 function similarly.

With the two-input OR gates 11, 12 and 13 having their outputs applied as inputs to the AND gate 14, it will be appreciated by those skilled in the art that the output of AND gate 14 is appropriately constrained to follow, in a logic sense, the requirements of a carry signal from a half adder. That is to say, at output point 27 from AND gate 14, the logic signal $C_n$ at that point equals $A_n \cdot B_n + C_{n-1} + B_n \cdot C_{n-1}$, which will be recognized is the logic requirement for a carry in binary arithmetic. Although the appropriate logic representation is present at the point 27 output of AND gate 14, it should be recognized that the logic signal at that point has passed through two levels of passive logic gates and may be of insufficient amplitude to drive a succeeding half added passive logic input. Accordingly, amplification of the signal is required and an amplifier in the form of inverting amplifier 15 is provided. Furthermore, in order to restore the appropriate logic representation, a succeeding inverter 16 is then also required. It will also be seen that amplifiers 15 and 16 are utilized as parts of NOR gate 31 and 32 respectively, used in conjunction with the special exclusive OR and logical AND features of the invention.

In similar fashion, it may be seen that the correct logic sum output $S_n$ from the half adder comprising OR gate 17, AND gates 18 and 19 and OR gate 20 is obtained immediately at the output of OR gate 20 although two successive amplifying inverters 21 and 22 are added at the sum output in series. AND gate 19 between the output of OR gate 17 and the input of OR gate 20 performs a function in connection with providing the special logical AND operation, but is also related to the generation of a sum output signal in typical half adder operation. At this point then, the output of OR gate 20 satisfies the condition that $S_n$ or the sum signal from the S half adder is equal to:

$$\overline{A}_n \cdot \overline{B}_n \cdot C_{n-1} + \overline{A}_n \cdot B_n \cdot \overline{C}_{n-1} + A_n \cdot \overline{B}_n \cdot \overline{C}_{n-1} + A_n \cdot B_n \cdot C_{n-1}$$

The OR gate 20 is not in the form of the OR packages previously described; it comprises two PNP junction transistors T21 and T22 having their emitter electrodes connected to resistor R45 and thence to a +12 volt supply, while the collector electrodes are connected to a −1 volt source. The base electrodes constitute the inputs from AND gates 18 and 19. Transistors T21 and T23 are emitter-follower stages and perform the diode ORing function but provide in addition a current gain function.

The inverters of the drawing are represented for example by inverter 21; it comprises a PNP junction transistor T15 which serves the function of a transistor saturating switch, that is, T15 is always either completely on or completely off. T15 is turned on when its base potential is more negative than its emitter, and turned off when the base is positive with respect to the emitter. Logic inputs to inverter circuit 21 control the base potential of T15 through the voltage divider consisting of resistors R37 and R43. The function of the capacitor C15 is to improve transient response time of T15.

An inverter circuit performs the operation of providing a binary output which is of the opposite state from its input. Thus, in this case, an input of binary state one (zero volts) provides an output of binary state zero (+6 volts), and vice versa. When the input is at the zero volt level, the voltage divider action of resistors R37 and R43 causes the emitter-to-base junction of T15 to be forward biased and the transistor conducts, closing a current path from the −18 volt supply through resistor R39 and transistor T15 to the +6 volt terminal. The output is clamped at about +6 volts by the low forward resistance of transistor T15. With T15 in its on condition, the output clamp diode D43 is reverse-biased and effectively removed from the circuit. When the input to inverter 21 changes state, i.e., rises to the +6 volt level representing binary state zero, the base electrode of T15 reaches a voltage which is more positive than the emitter voltage because of the voltage divider action of R37 and R43. The emitter-to-base junction of T15 is then reverse-biased and T15 turns off. In the output clamp circuit, current then flows from the −18 volt supply through resistor R39 and diode D43 to ground. The output is clamped at zero volts by the low forward drop across diode D43. In this way, the circuit meets the defined requirements of an inverter.

In the circuit of the drawing, therefore, it may be seen that circuits 15, 16, 21 and 22 are all inverters of the type desired. However, in aridtion circuits 23 and 24 are also inverters, which are individually combined with inverters 15 and 16 to function as NOR gates. NOR gate 31 comprises inverters 15 and 23, and NOR gate 32 comprises inverters 16 and 24. The diode coupled between the base and emitter electrodes in each of inverters 15 and 16 functions to improve the transient response of inverters 15 and 16. Before discussing the operation of NOR gates 31 and 32 and the significance of their input signals, as well as the significance of the output signal $Z_n$ from NOR gate 31 applied as an input to AND gate 19, it should be understood that without the operation of inverters 23 and 24, the circuit thus far described constitutes one full adder stage of a parallel adder. Thus, the output of inverter 16 constitutes a properly amplified output carry signal $C_n$ from its half adder stage adapted to be applied to the next most significant adder stage, while the output from inverter 22 constitutes a properly amplified sum signal $S_n$ properly utilizable elsewhere in the digital computer.

The logic operation of a NOR gate is such that only if all of the input signals to the NOR gate are at binary zero can the output be in the binary one state. For any other input signal permutation, the output of the NOR gate is in the binary zero state. This operation is provided by NOR gates 31 and 32. Consider the operation of NOR gate 31; the two input signals thereto are applied to resistors R17 and R13; the output is taken from NOR gate 31 at the junction 35 of the collector electrodes of transistors T11 and T17. With both inputs at +6 volts, both T11 and T17 are switched off. The output is held at zero volts or binary one by resistor R18 and diode D37. When one of the two inputs changes from binary zero to binary one (from +6 volts to zero volts), T11, for example, is turned on, holding the output at +6 volts and thereby causing the output signal to change state form one to zero. If, instead, the other input had gone to zero volts, then T11 would be off and T17 would be turned on. The output, of course, is as previously, binary zero. When both the inputs are in binary state one or zero volts, both T11 and T17 are in their on condition and the output is at binary zero. Thus, this operation with respect to the specific switching characteristics of the circuit conforms to the logic requirements of a NOR gate.

Let us now consider the operation of the circuit of the drawing, not in its function as a full adder, as such, but in its function as a special logic circuit to provide the exclusive OR function required for various comparison purposes as, for example, in real time applications of digital computers such as process control computers previously discussed. In such a digital computer the circuit of the drawing represents but one of many, perhaps twenty, full adder circuits in parallel, which may perform a similar logic function.

The exclusive OR logic function as performed by the full adder is such that an output signal in the binary one state is achieved on the output lead 41 (which ordinarily supports the sum or $S_n$ output when the adder is performing its computation function) when either the $A_n$ or the $B_n$ input signals on input leads 42 and 43 is in the binary one state, but not if both $A_n$ and $B_n$ are in the binary one state. To achieve this, the control signal $X_n$ is applied on input lead 44 to inverter 24 of NOR gate 32. At the same time that $X_n=1$ is applied on lead 44, the signal $Y_n=0$ is applied on the input lead 46 to inverter 23 of NOR gate 31.

Consider now what happens under the conditions $X=1$ and $Y=0$ on leads 44 and 46. The application of $X=1$ to NOR gate 32 forces the output or carry lead 47 to be in the binary zero state. It may be recalled that a NOR gate functions such that if either or both of the two input leads are in the one state, the output must be in the zero state. This means that the carry output of this stage or $C_n$ is equal to zero. Since this adder is merely one of many full adders comprising the parallel adder of the computer, it should be understood that precisely the same signals may be applied to each and all of the full adders and thus every carry output lead for every one of the full adders may be in the binary zero state. It follows, therefore, that under the condition $X=1$ applied to all of the adders, all of the carry signal inputs are in the binary zero state. In the drawing shown, therefore, the input $C_{n-1}$ on input lead 48 is in the binary zero state on this and all the full adders. As a consequence, the output of AND gate 18 in the bottom half adder must be zero since one of its inputs, $C_{n-1}$, is zero. On the other hand, the output of OR gate 17 is $(A_n+B_n)$ since $C_{n-1}$ is equal to zero. $(A_n+B_n)$ is applied as the input to AND gate 19 from OR gate 17 while zero is applied to one input of OR gate 20 (from AND 18). AND gate 19, will pass the signal from OR 17, to OR gate 20 and thence on through the inverters 21 and 22 and out through output lead 1, depending on whether or not $Z_n$ is in a binary one state on the other input lead 51 to AND gate 19. Therefore, an output can occur from AND gate 19 only if $Z_n=1$.

As will presently be seen, $Z_n$ is equal to one only under certain conditions, namely, only when either $A_n$ or $B_n$ is equal to one, but not when both are equal to one. Since the input to AND 19 from OR 17 is $(A_n+B_n)$, this means that the output of AND 19 must be the exclusive OR function of $A_n$ and $B_n$. It may be recalled that input signal $Y_n$ on lead 46 is equal to zero for this exclusive OR operation. Since this control signal is zero, the output from NOR gate 31 on lead 51 can be in the binary one state only if the input to the inverter 15 of NOR gate 31 is equal to zero. The output from AND gate 14 which is applied to inverter 15 or NOR gate 31 can be binary zero only if $A_n$ and $B_n$ are not both equal to one. This is because when $A_n$ and $B_n$ are both equal to binary one, all three inputs to AND gate 14 are in the one state and the output of AND 14 would therefore also be in the one state. Thus, when $A_n$ and $B_n$ are not both equal to one, $Z_n$ is equal to one on input lead 51 and the signal from OR gate 17 is passed through AND gate 19 and thence through OR gate 20 on out to output lead 41. However, when $A_n$ and $B_n$ are both equal to one, then the output signal from OR gate 17 is blocked at AND gate 19. Since the signal from OR gate 17 is $(A+B)$ and AND gate 19 blocks its passage as a consequence of the $Z=0$ signal when $A_n$ and $B_n$ are both equal to one, it follows that the output from AND gate 19 in a generalized logic form is the exclusive OR function.

The logical AND control function may also be provided by the full adder of the drawing, but only when the control signal $X_n$ equals zero, and control signal $Y_n$ equals one. Under these circumstances, it may be seen that the carry signal $C_n$, and therefore the carry signals in all the other full adders, are forced to be in the binary one state (for the exclusive OR situation it was forced to be in the binary zero state). With $Y_n$ equal to one on lead 46, the output or NOR gate 31 must of necessity be zero, and thus the input to inverter 16 of NOR gate 32 must also be zero. As a consequence, NOR gate 32 has a one output from its inverter 24 and a one output from its inverter 16, because $X=0$ and $Y_n=1$ forces this condition. Accordingly, the output of NOR gate 32 on lead 47 is constrained to be in the binary one state. However, with the output of NOR gate 31 forced to be zero, it follows that $Z_n$ is forced to be zero, i.e., whenever $Y_n$ is equal to one, $Z_n$ must be equal to zero. In this situation AND gate 19 blocks anything that comes to it from OR gate 17 and therefore the OR gate is effectively cut out of the circuit. However, the AND gate 18 output is applied directly to an OR gate 20, and an output from AND gate 18 can now occur (remembering that $C_{n-1}$ has been forced to be equal to binary one) when both $A_n$ and $B_n$ are equal to one. When this happens, a binary one output from AND gate 18 is applied to OR gate 20 and thence through the amplifying inverters 21 and 22 to provide a binary one output signal on lead 41. Effectively, therefore, when $X_n=0$ and $Y_n=1$ (forcing $Z_n=0$ and $C_n=C_{n-1}=1$ the output signal on lead 41 is equal to the logic condition $A_n \cdot B_n$.

From the foregoing it is established that when the full adder is not performing a computation, it may perform either the exclusive OR logic function or the logical AND function, depending upon the states of $X_n$ and $Y_n$ control signals. The appropriate voltage levels (zero and +6 volts) for each of the $X_n$ and $Y_n$ control signals may be obtained from an appropriate source elsewhere in the computer for application to control leads 44 and 46 under control of the computer program, or perhaps asynchronously under the control of circuitry elsewhere. As may be seen from the circuit of the drawing, typical full adder computational operation occurs when both $X_n$ and $Y_n$ are in the binary zero state. Under these conditions the $C_n$ carry signal is a function solely of the $A_n$ and $B_n$ inputs, and the computationally determined carry signal $C_{n-1}$ from the next least significant adder stage.

In a parallel adder comprising a multiplicity of full adder stages, the full adder stage for the least significant digit is one which of necessity can have no carry introduced to it from a preceding stage, since it is the first stage. The equivalent of the $C_{n-1}$ input lead to the full adder, however, may be obtained from a flip-flop which is controlled, in a manner well known in the art, to provide a binary one or zero output during the performance of the logical control function. Thus, for example, during the exclusive OR control operation, a binary zero carry signal may be applied from the flip-flop as the carry input to the first full adder and a binary one signal may be applied when the logical AND function is required.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to be secured by Letters Patent of the United States is:

1. Apparatus for normally performing a computation operation on input information signals applied thereto and for selectively performing an exclusive OR operation on the input information signals comprising: carry generation means responsive to the input information signals for providing an intermediate signal representing carry information and for normally providing a corresponding carry output signal, sum generation means responsive to the input information signals and to the intermediate signal of said carry generation means for normally providing an appropriate sum output signal, control means for selectively providing a control signal, and means responsive to the control signal provided by said control means for causing the carry output signal provided by said carry generation means to assume a predetermined state independent of the input information signals and for causing said sum generation means to utilize the intermediate signal provided by said carry generation means to generate an output signal representing the result of an exclusive OR operation performed on the input information signals.

2. Apparatus for normally performing a computation operation on two input information signals and an input carry signal applied thereto and for selectively performing an exclusive OR operation on the input information signals comprising: carry generation means responsive to the input information and carry signals for providing an intermediate signal representing carry information and for normally providing a corresponding carry output signal, sum generation means responsive to the input information and carry signals and to the intermediate signal of said carry generation means for normally providing an appropriate sum output signal, input means connected to said carry generation means and to said sum generation means for applying the input information and carry signals thereto, control input means for selectively providing a control signal, and means responsive to the control signal provided by said control input means for causing the carry output signal provided by said carry generation means to assume a predetermined state independent of the input information and carry signals and the input carry signal provided by said input means to assume a corresponding state and for causing said sum generation means to utilize the intermediate signal provided by said carry generation means to generate an output signal representing the result of an exclusive OR operation performed on the input information signals.

3. Apparatus for normally performing a computation operation on input information signals applied thereto and for selectively performing one of two logical operations on the input information signals comprising: carry generation means responsive to the input information signals for normally providing an intermediate signal representing carry information and for normally providing a corresponding carry output signal, sum generation means responsive to the input information signals and to the intermediate signal of said carry generation means for normally providing an appropriate sum output signal, control means for selectively identifying one of the two logical operations, means responsive to an identification of the first logical operation by said control means for causing the carry output signal provided by said carry generation means to assume a first predetermined state independent of the input information signals and for causing said sum generation means to utilize the intermediate signal provided by said carry generation means to generate an output signal representing the result of the first logical operation performed on the input information signals, and means responsive to the identification of the second operation by said control means for causing the carry output signal provided by said carry generation means to assume a second predetermined state independent of the input information signals and for causing the intermediate signal provided by said carry generation means to assume a predetermined state independent of the input information signals whereby the sum generation means generates an output signal representing the result of the second logical operation performed on the input information signals.

4. The combination of claim 3 in which the first logical operation is an exclusive OR operation and the second logical operation is a logical AND operation.

5. Apparatus for normally performing a computation operation on two input information signals and an input carry signal applied thereto and for selectively performing one of two logical operations on the input information signals comprising: carry generation means responsive to the input information and carry signals for normally providing an intermediate signal representing carry information and for normally providing a corresponding carry output signal, sum generation means responsive to the input information and carry signals and to the intermediate signal of said carry generation means for normally providing an appropriate sum output signal, input means connected to said carry generation means and said sum generation means for applying the input information and carry signals thereto, control input means for selectively providing a first control signal identifying the exclusive OR operation and second control signal identifying the logical AND operation, means responsive to the first control signal provided by said control input means for causing the carry output signal provided by said carry generation means to assume a first predetermined state independent of the input information and carry signals and the input carry signal provided by said input means to assume a corresponding state and for causing said sum generation means to utilize the intermediate signal provided by said carry generation means to generate an output signal representing the result of an exclusive OR operation performed on the input information signals, and means responsive to the second control signal provided by said control input means for causing the carry output signal provided by said carry generation means to assume a second predetermined state independent of the input information and carry signals and the input carry signal provided by said input means to assume a corresponding state and for causing the intermediate signal provided by said carry generation means to assume a predetermined state independent of the input information and carry signals whereby the sum generation means generates an output signal representing the result of a logical AND operation performed on the input information signals.

6. Apparatus for normally performing a computation operation on two input information signals and an input carry signal applied thereto, each of said signals having one of two binary states, and for selectively performing one of two logical operations on the input information signals comprising: carry generation means responsive to the input information and carry signals for normally providing an intermediate signal which is a binary 0 when a carry is generated as a result of the computation operation performed on the input signals and a binary 1 when no carry is present and for normally providing a corresponding inverted carry output signal, sum generation means including gating means for providing a sum output signal, said gating means being responsive to a binary 0 intermediate signal provided by said carry generation means to cause the sum output signal to be a binary 0 unless all of the input signals are binary 1's, control means for selectively providing first and second control signals, means responsive to the first control signal provided by said control means for causing the carry output signal provided by said carry generation means and the input carry signal to be a binary 0 and for causing said sum generation means to generate an output signal representing the result of an exclusive OR operation performed on the input information signals, and means responsive to the second control signal provided by said control means for causing the carry output signal provided by said carry generation means and the input carry signal to be a binary 1 and for causing the intermediate signal provided by said carry generation means to be a binary 0 causing the sum generation means to generate an output signal representing the result of a logical AND operation performed on the input information signals.

7. In combination, circuit means, first input means connected to said circuit means for receiving two binary information signal inputs and a binary carry signal input, second input means separate from said first input means connected to said circuit means for receiving a plurality of binary control signal inputs, output means connected to said circuit means for providing first and second output signals, first means included in said circuit means responsive to a first permutation of binary states of said control signal inputs for causing said circuit means to perform a logical AND operation on said information signal inputs and to provide the result of the logical AND operation to said output means, second means included in said circuit means responsive to a second permutation of binary states of said control signal inputs for causing said circuit means to perform an exclusive OR operation on said information signal inputs and to provide the result of the exclusive OR operation to said output means, and third means included in said circuit means responsive to a third permutation of binary states of said control signal inputs for causing said circuit means to perform an arithmetic operation on said information signal and carry signal inputs and to provide the result of the arithmetic operation to said output means.

8. The circuit of claim 7 in which said circuit means includes means responsive to the first permutation of binary states of said control signal inputs for causing said first output signal to assume a first binary state and said second output signal to indicate the result of the logical AND operation, means responsive to the second permutation of binary states of said control signal inputs for causing said first output signal to assume a second binary state and said second output signal to indicate the result of the exclusive OR operation, and means responsive to the third permutation of binary states of said control signal inputs for causing said first and second output signals to indicate the carry and sum respectively as determined by the rules of binary addition applied to said two information signal inputs and said carry signal input.

9. Apparatus for normally performing a computation operation on input signals applied thereto and for selectively performing one of two logical operations on the input signals, said apparatus comprising: carry generation means responsive to the input signals for providing a signal representing carry information as determined by the rules of binary addition applied to the input signals, control means for selectively providing a first control signal identifying the logical AND operation or a second control signal identifying the exclusive OR operation, a first NOR gate for receiving the first control signal when provided by said control means and the carry information signal, a second NOR gate for receiving the output of said first NOR gate for normally providing a carry output signal and for receiving said second control signal when provided by said control means, and sum generation means responsive to the input signals and to the output signal of said first NOR gate for normally providing an appropriate sum output signal, whereby the output signal of said second NOR gate assumes a first predetermined state and the output signal of said sum generation means represents the result of a logical AND operation performed on the input signals when the first control signal is applied to the first NOR gate and the output signal of said second NOR gate assumes a second predetermined state and the output signal of said sum generation means represents the result of an exclusive OR operation performed on said input signals when the second control signal is applied to said second NOR gate.

References Cited by the Examiner

UNITED STATES PATENTS

| | | | |
|---|---|---|---|
| 3,028,088 | 4/1962 | Dunham | 235—164 |
| 3,075,093 | 1/1963 | Boyle | 307—88.5 |
| 3,081,032 | 3/1963 | Keir et al. | 235—175 |
| 3,201,574 | 8/1965 | Szekely | 235—175 |

OTHER REFERENCES

Clapper: "Combined Register Adder," IBM Technical Disclosure Bulletin, vol. 2, No. 5, February 1960, pages 68, 71.

MALCOLM A. MORRISON, *Primary Examiner.*

M. J. SPIVAK, *Assistant Examiner.*